United States Patent [19]

Maurer et al.

[11] Patent Number: 5,338,524
[45] Date of Patent: Aug. 16, 1994

[54] PROCESS FOR THE PRODUCTION OF COARSE-GRAINED, ANHYDROUS CALCIUM MONOHYDROGEN PHOSPHATE (DICALCIUM PHOSPHATE ANHYDRIDE) AND A DEVICE FOR CARRYING OUT THE PROCESS

[75] Inventors: Alexander Maurer, Mannheim; Guenter Raab; Gudrun Raab, both of Laudenbach; Hans-Georg Steinert, Eschelbronn; Richard Taenzler, Laudenbach, all of Fed. Rep. of Germany

[73] Assignee: BK Ladenburg GmbH, Ladenburg, Fed. Rep. of Germany

[21] Appl. No.: 997,368

[22] Filed: Dec. 23, 1992

[51] Int. Cl.$^5$ .............................................. C01B 25/32
[52] U.S. Cl. ...................................... 423/309; 423/308
[58] Field of Search .......................................... 423/309

[56] References Cited

U.S. PATENT DOCUMENTS

| 4,721,615 | 1/1988 | Griffith et al. | 423/309 |
| 4,755,367 | 7/1988 | Brachtel et al. | 423/309 |

FOREIGN PATENT DOCUMENTS

| 0210661 | 2/1987 | European Pat. Off. | |
| 2153725 | 6/1973 | Fed. Rep. of Germany | |
| 207818 | 11/1984 | Japan | 423/309 |
| 1304218 | 1/1973 | United Kingdom | |

OTHER PUBLICATIONS

Gmelin, vol. 28, Part B, II, p. 1167. (Jul., 1964).

Primary Examiner—Wayne Langel
Attorney, Agent, or Firm—Foley & Lardner

[57] ABSTRACT

The present invention provides a process and apparatus for the production of coarse-grained dicalcium phosphate anhydride, at least 95% of which consists of particles with a grain diameter of >45 μm, wherein, at a temperature of 60° to 100° C., a highly reactive calcium component, for example freshly slaked milk of lime or an aqueous slurry or suspension of calcium hydroxide and/or calcium carbonate, is introduced directly into the stirrer zones of a vessel containing aqueous phosphoric acid and having one or more turbulent stirrer zones. An equivalent amount of aqueous phosphoric acid is introduced into another zone of the vessel, the speed of introduction being so regulated that a pH value of 3.0 to 4.5 is obtained in the stirrer zone and the whole batch or a continuously or semi-continuously removed part thereof is cooled to 40° to 60° C. The removed part then is mixed with an additional calcium component, for example milk of lime, to obtain a pH value of from 5.5 to 6.8, the mixture further stirred for 10 to 60 minutes and the resultant course-grained dicalcium phosphate anhydride is filtered off and dried.

12 Claims, 5 Drawing Sheets

| Size Microns | %under | Size band Microns | | % | Result source = Sample |
|---|---|---|---|---|---|
| | | | | | Record No. = 78 |
| | | | | | Focal length = 300 mm |
| 564.0 | 100.0 | | | | Experiment type pil |
| 261.7 | 97.1 | 564.0 | 261.7 | 2.9 | Volume distribution |
| 160.4 | 61.1 | 261.7 | 160.4 | 36.0 | Beam length = 2.0 mm |
| 112.8 | 26.5 | 160.4 | 112.8 | 34.6 | Obscuration = 0.1257 |
| 84.3 | 7.5 | 112.8 | 84.3 | 19.0 | Volume Conc. = 0.2188 % |
| 64.6 | 4.0 | 84.3 | 64.6 | 3.5 | Log. Diff. = 3.50 |
| 50.2 | 2.9 | 64.6 | 50.2 | 1.2 | Model indp |
| 39.0 | 2.8 | 50.2 | 39.0 | 0.1 | |
| 30.3 | 2.2 | 39.0 | 30.3 | 0.5 | D(v, 0.5) = 145.3 µm |
| 23.7 | 1.6 | 30.3 | 23.7 | 0.6 | D(v, 0.9) = 218.0 µm |
| 18.5 | 1.6 | 23.7 | 18.5 | 0.0 | D(v, 0.1) = 91.0 µm |
| 14.5 | 1.6 | 18.5 | 14.5 | 0.0 | D(4, 3) = 151.5 µm |
| 11.4 | 1.0 | 14.5 | 11.4 | 0.6 | D(3, 2) = 103.5 µm |
| 9.0 | 0.9 | 11.4 | 9.0 | 0.1 | Span = 0.9 |
| 7.2 | 0.9 | 9.0 | 7.2 | 0.0 | Spec. surf. area |
| 5.8 | 0.7 | 7.2 | 5.8 | 0.1 | 0.03 sq.m/cc. |

| SIZE MICRONS | % UNDER | SIZE BAND MICRONS | | % | RESULT SOURCE = SAMPLE |
|---|---|---|---|---|---|
| 564.0 | 100.0 | | | | RECORD NO. = 0 |
| 261.7 | 93.7 | 564.0 | 261.7 | 6.3 | FOCAL LENGTH = 300 mm |
| 160.4 | 89.0 | 261.7 | 160.4 | 4.7 | EXPERIMENT TYPE PIL |
| 112.8 | 83.5 | 160.4 | 112.8 | 5.4 | VOLUME DISTRIBUTION |
| 84.3 | 76.1 | 112.8 | 84.3 | 7.4 | BEAM LENGTH = 14.3 mm |
| 64.6 | 68.3 | 84.3 | 64.6 | 7.8 | OBSCURATION = 0.1120 |
| 50.2 | 57.8 | 64.6 | 50.2 | 10.5 | VOLUME CONC. = 0.0085% |
| 39.0 | 46.3 | 50.2 | 39.0 | 11.5 | LOG. DIFF. = 3.41 |
| 30.3 | 35.1 | 39.0 | 30.3 | 11.1 | MODEL INDP |
| 23.7 | 22.9 | 30.5 | 23.7 | 12.2 | D(v,0.5) = 42.3 μm |
| 18.5 | 13.5 | 23.7 | 18.5 | 9.1 | D(v,0.9) = 177.0 μm |
| 14.5 | 8.3 | 18.5 | 14.5 | 5.5 | D(v,0.1) = 15.8 μm |
| 11.4 | 5.0 | 14.5 | 11.4 | 3.3 | D(4,3) = 75.0 μm |
| 9.0 | 3.2 | 11.4 | 9.0 | 1.9 | D(3,2) = 31.1 μm |
| 7.2 | 2.1 | 9.0 | 7.2 | 1.1 | SPAN = 3.8 |
| 5.8 | 1.1 | 7.2 | 5.8 | 1.0 | SPEC. SURF. AREA 0.02 sq.m/cc. |

| Size Microns | % under | Size band Microns | | % | Result source = Sample |
|---|---|---|---|---|---|
| 564.0 | 100.0 | | | | Record No. = 76 |
| 261.7 | 90.9 | 564.0 | 261.7 | 9.1 | Focal length = 300 mm |
| 160.4 | 64.7 | 261.7 | 160.4 | 26.2 | Experiment type pil |
| 112.8 | 34.7 | 160.4 | 112.8 | 29.9 | Volume distribution |
| 84.3 | 9.8 | 112.8 | 84.3 | 24.9 | Beam length = 2.0 mm |
| 64.6 | 5.3 | 84.3 | 64.6 | 4.6 | Obscuration = 0.1771 |
| 50.2 | 4.1 | 64.6 | 50.2 | 1.2 | Volume Conc. = 0.2589% |
| 39.0 | 4.0 | 50.2 | 39.0 | 0.1 | Log. Diff. = 3.65 |
| 30.3 | 3.8 | 39.0 | 30.3 | 0.2 | Model indp |
| 23.7 | 2.9 | 30.3 | 23.7 | 0.9 | D(v, 0.5) = 132.4 μm |
| 18.5 | 2.9 | 23.7 | 18.5 | 0.1 | D(v, 0.9) = 250.0 μm |
| 14.5 | 2.8 | 18.5 | 14.5 | 0.1 | D(v, 0.1) = 85.1 μm |
| 11.4 | 2.2 | 14.5 | 11.4 | 0.6 | D(4, 3) = 155.5 μm |
| 9.0 | 1.8 | 11.4 | 9.0 | 0.3 | D(3, 2) = 80.7 μm |
| 7.2 | 1.6 | 9.0 | 7.2 | 0.2 | Span = 1.2 |
| 5.8 | 1.2 | 7.2 | 5.8 | 0.4 | Spec. surf. area 0.02 sq.m/cc. |

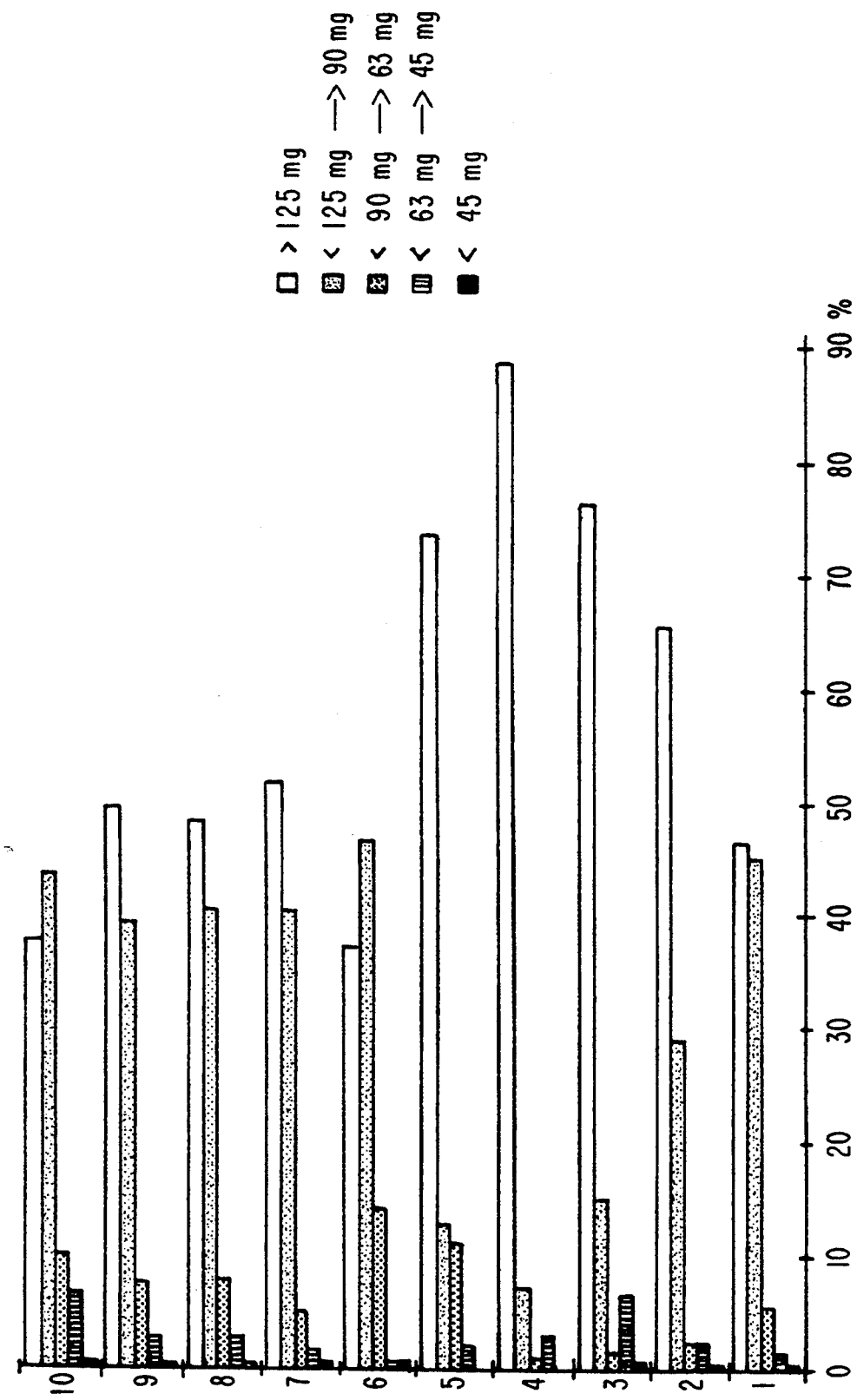

PROCESS FOR THE PRODUCTION OF COARSE-GRAINED, ANHYDROUS CALCIUM MONOHYDROGEN PHOSPHATE (DICALCIUM PHOSPHATE ANHYDRIDE) AND A DEVICE FOR CARRYING OUT THE PROCESS

BACKGROUND OF THE INVENTION

1. Field of the Invention

The present invention is concerned with a process for the production of coarse-grained, anhydrous calcium monohydrogen phosphate (dicalcium phosphate anhydride), and a device for carrying out the process.

2. Description of Related Art

Two secondary dicalcium phosphates are known, namely, the anhydrous form $CaHPO_4$ (DCPA), and the dihydrate $CaHPO_4.2H_2O$ (DCPD). Both compounds occur in nature in crystalline form as monetite and brushite. Various processes for the production of the two compounds are known from the literature, the anhydride in particular being produced in aqueous solution at an elevated temperature by a precipitation reaction according to the following equation:

$$H_3PO_4 + CaO \rightarrow CaHPO_4 + H_2O$$

The dihydrate typically is obtained at temperatures of less than 36° C. and is slowly converted into the anhydride by heating to temperatures above 36° C.

These products have found a certain measure of interest in dental chemistry because of their use with a fine-grained structure as cleaning materials in toothpastes. The anhydride is the product with the greater hardness, and it is therefore used for the adjustment of the abrasive properties, and for smokers' pastes.

In the pharmaceutical industry, coarse-grained dicalcium phosphate dihydrate is used to a large extent as a carrier substance in direct tabletting. For the achievement of a reproducible tablet having a definite breaking strength at the same pressing force, the following requirements are required for the tabletting adjuvant: for uniform dosing in the tabletting press, the product must a) be readily pourable, which means the product must have a coarse grain structure in the range of 45 to 300 $\mu m$ and a narrow grain distribution within this range, and b) the crystal form should be almost spherical. DCPD fulfills these requirements very well. However, the field of use of DCPD is limited to active material combinations which are not sensitive to water since the dihydrate slowly releases water above 40° C., and thereby changes incongruently.

Therefore, the use of dicalcium phosphate anhydride is of increasing interest for the direct tabletting of pharmaceutical products which is not limited to active material combinations which are not sensitive to water. However, in the case of the direct precipitation of DCPA, a very fine grained material is preponderantly obtained which cannot be tabletted directly. Therefore, there has long been a need for the production of a coarse-grained dicalcium phosphate anhydride for use in direct tabletting.

Numerous processes are known for the production not only of DCPD but also of DCPA: Gmelin, Vol. 28, Part B, II, page 1167; EP 0 210 661 from DCPD granulate by the removal of water; U.S. Pat. No. 3,488,145 by crystallizing out DCPA at 80° C., formation from phosphorus pentoxide and calcium oxide at 40° C. with a grain size greater than 10 $\mu m$; GB 1,304,218, production of DCPD and conversion into DCPA by heating the suspension; DE C. 21 53 725, precipitation from excess phosphoric acid with calcium oxide/calcium carbonate.

However, a disadvantage of all precipitation reactions which yield DCPA according to the processes described in the literature is that the DCPA is obtained in very finely-divided form and thus is not directly suitable for tabletting (see the remarks made in EP 0 210 661, page 2, line 11). As is known in the art, products produced by such processes have an average grain diameter of less than 50 $\mu m$ when underground.

According to the known processes for the production of dicalcium phosphate anhydride, milk of lime is, for example, introduced into dilute phosphoric acid, the phosphoric acid solution thereby being heated to at least 70° C. Subsequently, with vigorous stirring, highly concentrated milk of lime is added thereto as quickly as possible until a pH value of 6.5 is achieved in the resultant suspension, whereafter the reaction is practically finished. In the filtrate obtained after the separation of the solid material, there are generally found about 5 mg/l of phosphorus pentoxide. The introduction of the milk of lime usually takes place by allowing the suspension to run in from the lid of the reaction vessel.

In the case of such a procedure, there is obtained a finely-divided material which, because of its fineness, can, in part, only be filtered with difficulty. A precipitation at comparatively low temperatures, as well as a slow introduction of the milk of lime, results in a co-precipitation of the dihydrate.

If an attempt is made to increase the average grain diameter by measures such as seeding of the reaction batch, longer residence times during the crystallization, lower precipitation temperatures or higher dilution of the reaction solutions, then only a small effect is obtained in the grain size.

The "coarser" crystals forming in purely statistical distribution can be separated by purely mechanical processes from the product stream by screening and/or sieving but the yield in the case of this procedure is extremely small. For this reason, it has been suggested to produce tablettable DCPA products by the roundabout way of drying DCPD (see EP 0 210 661). In addition to the precipitation, this process requires a compacting step of the DCPD and an energy-intensive drying to yield DCPA. This drying step is rather problematical since the separation of water from DCPD at temperatures of from 40° to 150° C. proceeds very slowly but, on the other hand, the product must not be overheated since, at higher temperatures, a further reaction to dicalcium diphosphate very easily takes place.

Therefore, there exists a need to provide a simple and economic process for the production of coarse crystalline dicalcium phosphate anhydride which, by compression, has a grain size sufficient for direct tabletting.

SUMMARY OF THE INVENTION

An object of the present invention therefore is to provide a simple and economic process for the production of coarse crystalline dicalcium phosphate anhydride which has a grain size sufficient for direct tabletting.

It also is an object of the present invention to provide a coarse crystalline dicalcium phosphate anhydride having a grain size distribution sufficient for direct tabletting.

A further object of the invention is to provide a process for the production of coarse crystalline dicalcium phosphate anhydride which does not include removal of water from dicalcium phosphate dihydrate by heating and other methods.

An additional object of the invention is to provide a device useful in producing a coarse crystalline dicalcium phosphate anhydride having a grain size distribution sufficient for direct tabletting.

In accordance with the foregoing objectives, there is provided a process for the production of coarse-grained dicalcium phosphate anhydride, at least 95% of which consists of particles with a grain diameter of >45 $\mu$m. The process involves directly introducing a highly reactive calcium component, for example in the form of freshly slaked milk of lime or an aqueous slurry or suspension of calcium hydroxide and/or calcium carbonate, at a temperature of 60° to 100° C., into the stirrer zones of a vessel containing phosphoric acid. The reaction vessel has one or more turbulent stirrer zones, and an equivalent amount of aqueous phosphoric acid is introduced into another zone of the vessel, the speed of dosing being regulated so that a pH value of 3.0 to 4.5 is attained in the stirrer zone. Either the whole batch, or a continuously or semi-continuously removed part thereof, is cooled to about 40° to about 60° C., mixed with an additional calcium component, for example milk of lime, to a pH value of from 5.5 to 6.8, further stirred for 10 to 60 minutes, and the resultant coarse-grained dicalcium phosphate anhydride filtered off and dried.

In accordance with the present invention, there is also provided a dicalcium phosphate anhydride produced by directly introducing a highly reactive calcium component, at a temperature of from about 60° to about 100° C., into a stirrer zone of a vessel containing phosphoric acid. The phosphoric acid is added to another zone of the multi-zoned reaction vessel so that the pH is maintained between about 3.0 and 4.5. The batch, or parts thereof, is removed, cooled to from about 40° to about 60° C., mixed with an additional calcium component raising the pH to a value between about 5.5 and about 6.8, and stirred for about 10 to about 60 minutes. The resulting dicalcium phosphate anhydride product then is filtered and dried. The dicalcium phosphate anhydride product has a grain size distribution within the range of from about 45 to about 800 $\mu$m with an average grain diameter from about 70 to about 150 $\mu$m.

In accordance with the present invention, there is also provided an apparatus useful in producing a dicalcium phosphate anhydride product having a grain size distribution within the range of from about 45 to about 800 $\mu$m with an average grain diameter from about 70 to about 150 $\mu$m. The apparatus of the invention contains a reaction vessel having a plurality of turbulent stirrer zones each having mechanical, electrical or pneumatic stirring mechanisms. The apparatus has one feeding mechanism for feeding the phosphoric acid component to one of the turbulent stirrer zones and another feeding mechanism for feeding the calcium component to a different turbulent feeding zone and capable of feeding the calcium component at various rates. The apparatus further is equipped with an outlet mechanism capable of withdrawing all or only a portion of the materials in the reaction vessel. There is further provided a feeding mechanism capable of feeding the calcium at various rates for feeding the additional calcium component to the withdrawn portion, a mixing mechanism for mixing the components, a filtering mechanism and a drying mechanism.

Further objects, features, and advantages of the present invention will become apparent from the detailed description of preferred embodiments discussed below.

BRIEF DESCRIPTION OF THE DRAWINGS

FIG. 8 illustrates the results obtained with the process described in Example 4.

DETAILED DESCRIPTION OF THE PREFERRED EMBODIMENTS

The process of the present invention takes place in a direct manner by precipitation crystallization from the reaction of phosphoric acid and highly reactive calcium components. Typical reactive calcium components include milk of lime, aqueous slurries of calcium hydroxide or calcium carbonate, and the reaction proceeds at elevated temperatures. The crystallization is controlled by utilization of the maximum dissolving speed of the calcium component by process-technical measures. The material produced by the process according to the present invention consists of particles at least about 95% of which have a grain diameter of > about 45 $\mu$m.

Figure 1:
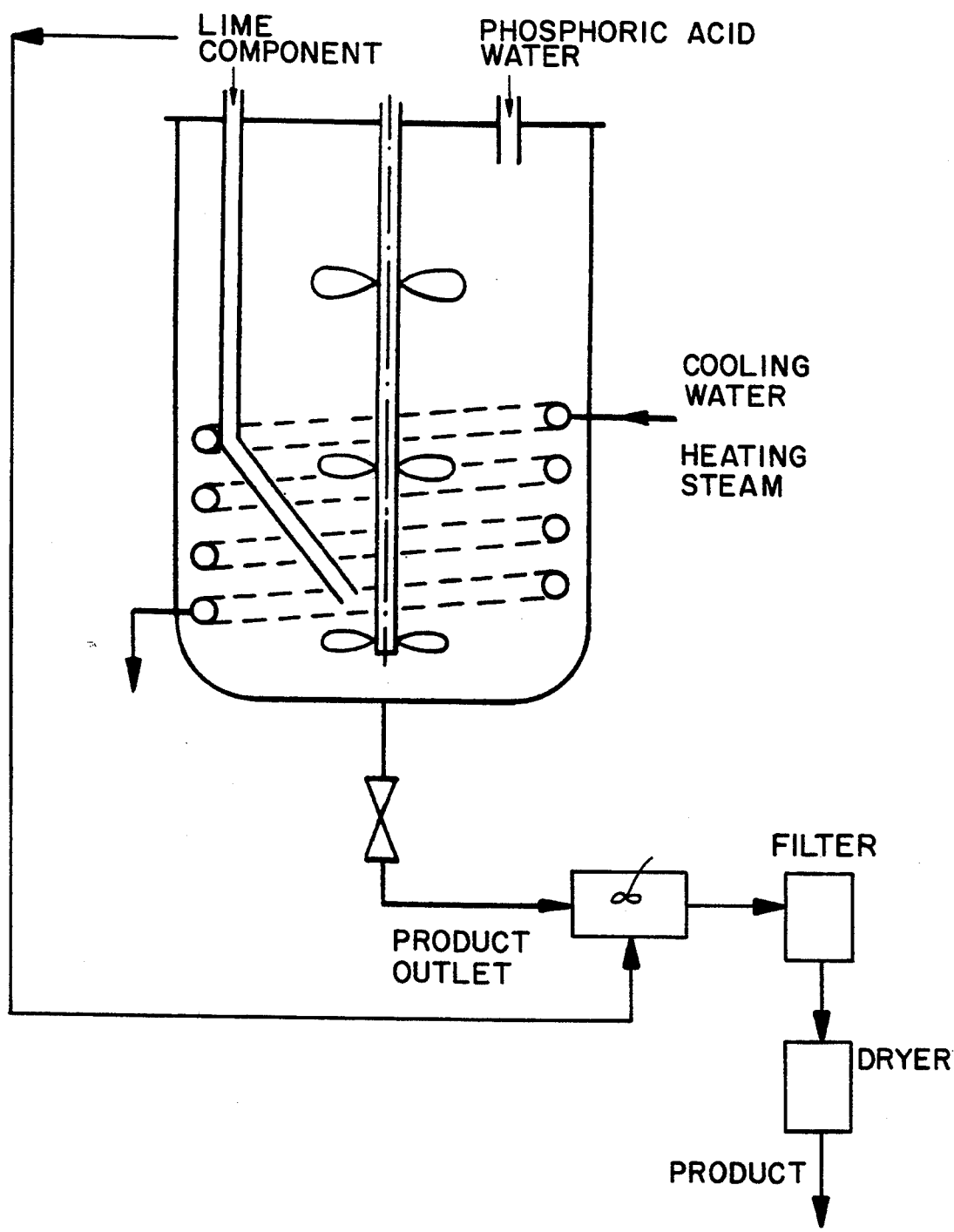
FIG. 1 illustrates an apparatus which can be used for carrying out the process according to the present invention.

Completely surprisingly, in accordance with the process of the present invention, there is obtained a coarse-grained, crystalline material by precipitation using the following procedure and a reaction vessel altered by simple measures (see FIG. 1 of the accompanying drawings). Throughout the specification and claims, the term "coarse-grained" means particles which have a grain size distribution in the range of from about 45 to about 800 $\mu$m.

If the lime components needed for the precipitation of the coarse dicalcium phosphate anhydride are passed through a tube directly under the surface of the reaction medium into the turbulent region of the stirrer, and if the calculated calcium component introduction is maintained at a high level adapted to the reactivity of the lime component, then dicalcium phosphate anhydride (DCPA) is obtained with a distinctly coarser grain. Measures and examples described hereinafter serve to optimize this effect.

As sources of calcium oxide used to produce the DCPA, there can be used, for example, calcined lime (CaO) in the form of milk of lime, calcium hydroxide or precipitated calcium carbonate, milk of lime thereby giving especially good results. Milk of lime used in accordance with the present invention typically has a concentration from about 30 to about 120 g/l, and preferably from about 50 to about 100 g/l, of calcium oxide. The reaction typically is carried out by heating and/or cooling at a temperature from about 60° to about 00° C., preferably from about 70° to about 90° C. and especially from about 75° to about 85° C. The phosphoric acid generally is diluted with water and preferably is used as a 30% solution.

The steps of the reaction are illustrated below. In the first step, solid calcium hydroxide is dissolved. The second step entails addition of phosphoric acid for the production of monocalcium phosphate. In the third step, additional calcium hydroxide is added to produce the dicalcium phosphate anhydride coarse crystalline product.

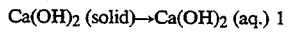

$Ca(OH)_2$ (solid)→$Ca(OH)_2$ (aq.)   1

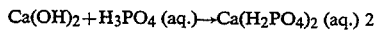

$Ca(OH)_2 + H_3PO_4$ (aq.)→$Ca(H_2PO_4)_2$ (aq.)   2

$Ca(H_2PO_4)_2$ (aq.) + $Ca(OH)_2$ → 2 $CaHPO_4$ + 2 $H_2O$   3

The first step of the precipitation reaction involves dissolving the calcium hydroxide present in suspension. The solubility of calcium hydroxide in water is 0.17%. To obtain excellent crystallization it is desirable to dissolve, as quick as possible, the milk of lime in the phosphoric acid used for the reaction. Therefore, the precipitation preferably takes place with highly reactive and especially finely-divided milk of lime suspensions. "Finely divided" milk of lime suspensions include those milk of lime suspensions which have been produced from a calcined lime with a speed of reaction of $t_u <$ about 3 minutes (80% reaction). These finely-divided milk of lime suspensions display dissolving times of $t_x(90)$ about 2 sec.

If an unreactive (coarse-grained) milk of lime is used, or if the milk of lime is not introduced into the turbulent region of the reactor, or if the milk of lime is introduced too quickly, then the milk of lime will not clearly dissolve in the second step of the formation of the monocalcium phosphate. Rather, a slime will form with striation formation. This slime no longer dissolves in the course of the reaction and leads to an excessive availability of crystallization nuclei which, especially in the third step of reaction, can generate an undesirable finely-divided DCPA.

The introduction of the milk of lime is adapted to the precipitation behavior of the DCPA. In the case of an introduction rate of 0.3 to 0.44 mole of calcium oxide per hours, and per mole of phosphoric acid used, there is obtained not only a permanently clear monocalcium phosphate solution but also, in the precipitation step, a sufficiently rapid crystallization without precipitation of small particles. Thus, a slower introduction of calcium oxide does not provide any additional advantages.

The introduction rate typically is kept constant to maintain a pH below about 4.5, and, in step 3 during the post-precipitation, where the pH is maintained below about pH 6.8, preferably below 5.8, the introduction rate is reduced to 0.27 to 0.42 mole calcium oxide/hour per mole of acid present, and preferably to 0.31 to 0.37 mole calcium oxide/hour per mole of acid. The process is carried out in order to achieve the end point of the reaction with certainty, and in order to avoid a precipitation of amounts of tricalcium phosphate. After the precipitation, which is preferably carried out at a temperature of 75° to 85° C., stirring is continued for 15 to 20 minutes.

The precipitated suspension then is processed in the conventional manner. The crystalline DCPA is filtered off, washed with water and dried in an airstream. A flow drier or a fluidized bed drier can thereby be used. Those skilled in the art recognize that other mechanisms known to dry crystalline material may be used. Upon drying, a small portion of the product DCPA with grain sizes of less than about 45 μm is screened off or sieved off in the conventional and known manner.

The screened off fine material can be dissolved in dilute phosphoric acid and returned to the batch.

The precipitation process also can be carried out semi-continuously. For this purpose, a part of the 30% phosphoric acid is placed in a batch container and milk of lime and phosphoric acid are introduced simultaneously at a mole ratio of about 1:1 with the speed given in the above-described process. As stated above, the milk of lime is introduced into the turbulent part of the reactor with the pH value thereby being adjusted to about 3. For fine adjustment, the introduction of the milk of lime is used as a control value since the milk of lime can be subject to small variations of content and viscosity. The quality of the water used also may have an influence. After definite intervals of time, a part of the precipitate suspension is removed, adjusted with milk of lime to pH 5.8 and passed to the further processing as described above.

After filtration, drying and sieving, the final DCPA product has pH values, measured in a 20% suspension, of about 6.8 to about 7.9, and calcination losses in the range of about 6.6 to about 8.0 wt%. By carrying out the process of the present invention, the proportion of material which can be used for direct tabletting with particle sizes of >45 μm is >90% and preferably >95%. The average grain diameter of such batches is in the range of from 130 to 150 μm.

The following Examples are given for the purpose of illustrating the present invention, reference thereby being made to the accompanying drawings.

EXAMPLE 1

Figures 2, 3:
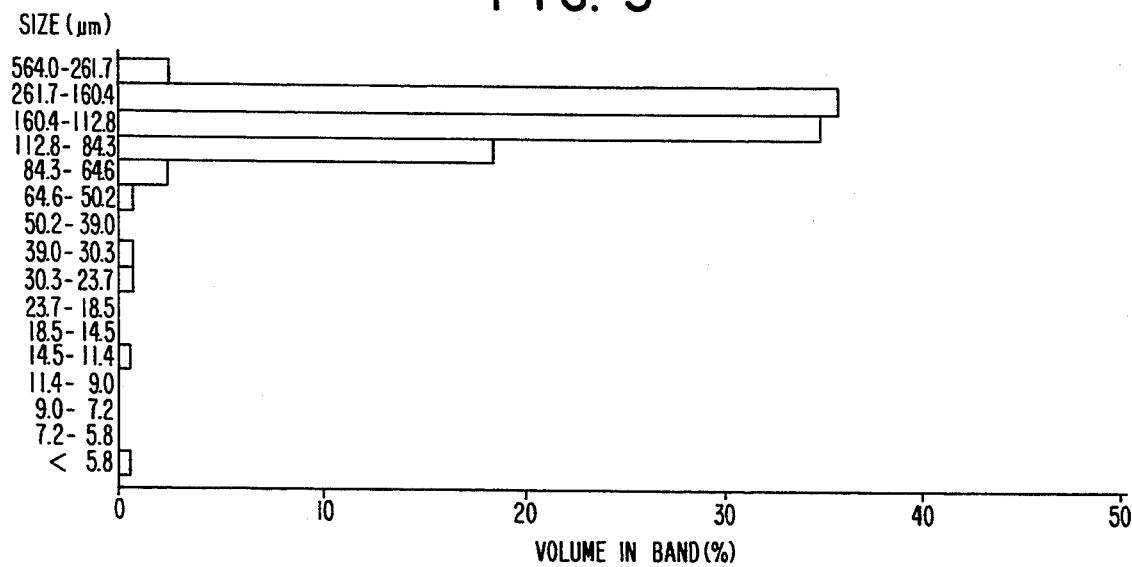
FIG. 2 and 3 illustrate the results obtained with the process described in Example 1.

Approximately 2000 l of 83% concentrated phosphoric acid are added to 6000 l of water in a reaction vessel as shown in FIG. 1, and heated to 80° C., while stirring. Subsequently, freshly slaked milk of lime having a concentration of about 55 g/l of calcium oxide is introduced as shown in FIG. 1 at a rate of about 11 m³/hour until a pH value of 4.5 is reached, the temperature thereby being maintained at about 80° C. by cooling and/or heating. Thereafter, the rate of addition of the slaked milk of lime is reduced to about 9.5 m³/hour and product precipitated until the pH is about 5.8. Stirring is continued for an additional 15 to 20 minutes, the batch thereby cooling somewhat (about 50° C). The batch is subsequently filtered over a vacuum band filter, dried in a flow drier and the particles with a size of less than 63 μm are sieved off. The yield of coarse-grained material amounts to more than about 95%, with the grain distribution shown in FIG. 2 and 3 of the accompanying drawings.

EXAMPLE 2 (COMPARATIVE EXAMPLE)

Figures 4, 5:
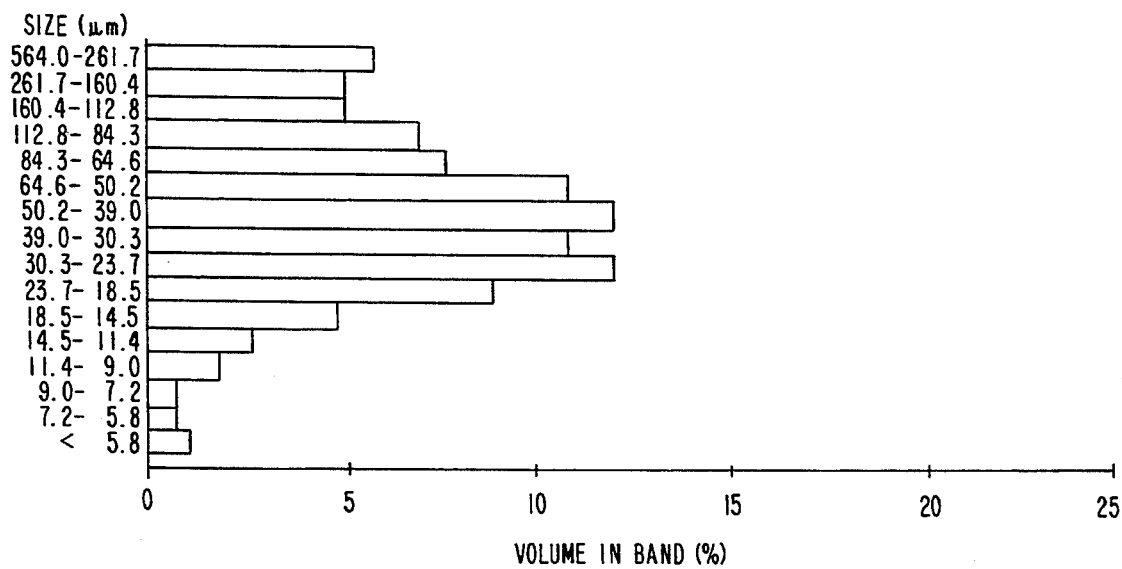
FIG. 4 and 5 illustrate the results obtained with the process described in Comparative Example 2.
Figures 6, 7:
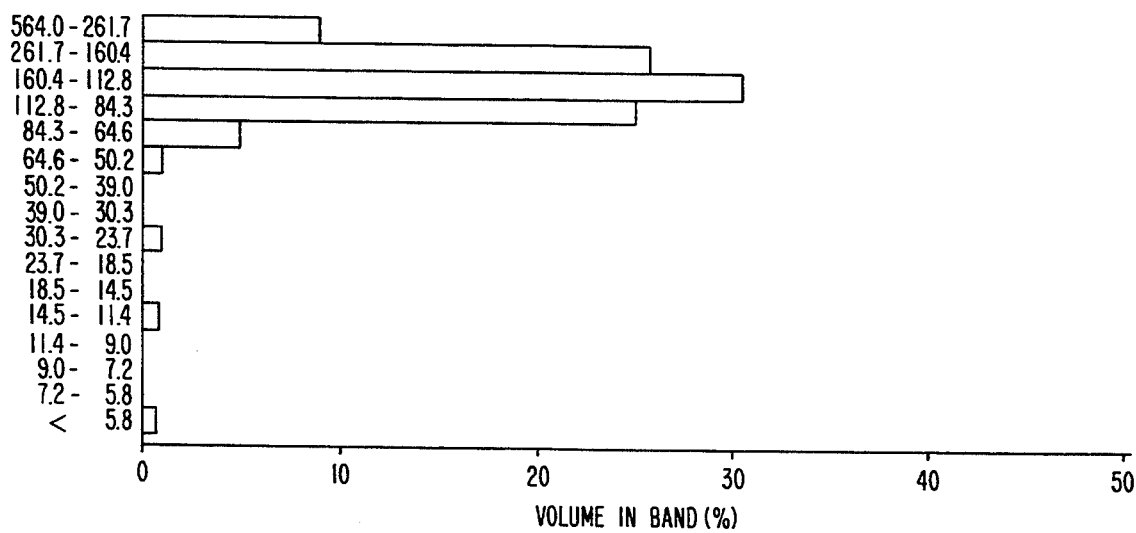
FIG. 6 and 7 illustrates the results obtained with the process described in Example 3.

In a conventional stirrer container, about 2000 l of 83% concentrated phosphoric acid are added to 6000 l of water and heated to 80° C., while stirring. Subsequently, freshly slaked milk of lime having a concentration of about 55 g/l of calcium oxide is introduced from above at a rate of 11 m³/hour until a pH value of 4.5 has been reached, the temperature thereby being maintained at about 80° C. by cooling and/or heating. Therefore, the speed of introducing the slaked milk of lime is reduced to about 9.5 m³ and precipitation is carried out until the pH is about 5.8. Stirring is continued for an additional 15 to 20 minutes, the batch thereby cooling somewhat (about 50° C.). Subsequently, the batch is filtered off via a vacuum band filter, dried in a flow drier and the particles with a size of less than 63 μm are sieved off. There is obtained a material with a grain distribution according to FIG. 4 and 5 of the accompanying drawings, i.e., only 30 to 40% of coarse-grained material as defined in the present invention.

EXAMPLE 3

Semi-continuous Process

Step 1.

In a 5m³ stirrer reactor with two impeller stirrer blades at one quarter and three quarters of the height of the container, 400 kg of water are placed and heated to 80° C. Subsequently, by way of a 3-component differential introduction scale (water/phosphoric acid/calcium hydroxide), there are introduced 3480 kg of a calcium hydroxide suspension, freshly produced in an after-connected continuous mixer, with a content of 100 g calcium oxide/kg at an introduction rate of 700 kg/hour simultaneously with 650 kg of an 83% phosphoric acid with an introduction rate of 200 kg/hour. After a post-reaction phase of 15 minutes, a pH value of 3.0 is obtained in the DCPA suspension.

Step 2

About one fifth of the DCPA suspension is run off into an after-connected 1 m³ stirrer container, its pH value is adjusted to 5.8 with the calcium component suspension, filtered over a vacuum band filter and the moist DCPA dried in a continuous fluidized bed drier. The fraction of less than 45 μm is separated off in an after-connected wind sifter with a high sharpness of separation. The yield of coarse-grained product is >95% with a grain distribution shown in FIG. 4 of the accompanying drawings.

Step 3

During further processing after step 2, the 5 m³ reaction vessel is again supplied with about 696 kg of a calcium hydroxide suspension introduced at a rate of introduction of about 580 kg/hour, and about 129 kg of phosphoric acid 83% introduced at a rate of about 165 kg/hour.

EXAMPLE 4,

The process described in Example 3 is carried out with the use of calcium carbonate as the source of calcium.

Step 1

Calcium carbonate milk with about 8.5 g of calcium oxide/kg.

Amount introduced: about 392 kg at a rate of about 720 kg/hours.

83% phosphoric acid.

Amount introduced: about 650 kg at a rate of about 260 kg/hour.

Step 2

Calcium carbonate milk:

Amount introduced: about 718 kg at a rate of about 590 kg/hour.

Amount introduced: about 130 kg at a rate of about 165 kg/hour.

Step 3

Repetition of step 2 ten times.

The grain size distribution before drying and classification is shown in FIG. 8 of the accompanying drawings.

The following is a schematic illustrative of the process reaction scheme according to the present invention.

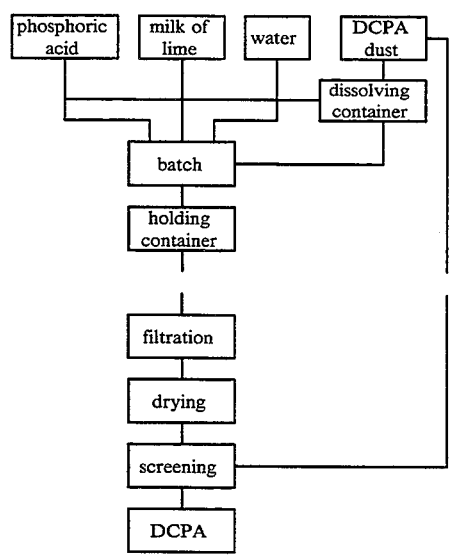

DCPA = dicalcium phosphate anhydride

While the present invention has been described in detail with respect to the foregoing detailed description of preferred embodiments, those skilled in the art recognize that various modifications and variations may be made without departing from the spirit and scope thereof.

What is claimed is:

1. A method of making coarse-grained dicalcium phosphate anhydride, at least 95% of which consists of particles with a grain diameter of > about 45 μm, comprising:

a) introducing a highly reactive calcium component at a temperature of about 60° to about 100° C. directly into a stirrer zone of a reaction vessel having one or more turbulent stirrer zones and introducing an equivalent amount of aqueous phosphoric acid into another zone of said vessel, wherein the speed of introducing the highly reactive calcium component is regulated to maintain a pH value of from about 3.0 to about 4.5 in said stirrer zone, whereby a precipitated product is formed;

b) removing the whole or a portion of the precipitated product and cooling the removed portion to a temperature within the range of from about 40° to about 60° C.;

c) mixing said removed portion with additional calcium component to maintain a pH value of from about 5.5 to about 6.8;

d) further stirring said removed portion for 10 to about 60 minutes; and e) filtering and drying the resultant coarse-grained dicalcium phosphate anhydride.

2. A method according to claim 1, wherein said calcium component in Step a) and c) is freshly slaked milk of lime having a concentration from about 30 to about 120 g/l of calcium oxide.

3. A method according to claim 2, wherein said milk of lime has a concentration of from about 50 to about 100 g/l of calcium oxide.

4. A method according to claim 1, wherein said calcium component is introduced in step a) at a rate of about 0.32 to about 0.44 mole of calcium oxide/hour per mole of phosphoric acid present to obtain a pH value of about 3.8, and said calcium component is subsequently introduced at a rate reduced by 5 to 15% compared to the original rate to obtain a pH of 6.2 in step c).

5. A method according to claim 1, wherein said precipitated product is produced at a temperature from about 75° to about 85° c.

6. A method according to claim 1, wherein a fine portion having a grain size of less than about 65 μm is separated by screening and/or sieving from the dried product of step e).

7. A method according to claim 6, wherein said fine portion separated is dissolved in diluted phosphoric acid, and returned to said vessel in step a).

8. A method according to claim 1, wherein said calcium component of Step a) is selected from the group consisting of milk of lime, an aqueous slurry of calcium hydroxide, an aqueous suspension of calcium hydroxide, and calcium carbonate.

9. A method according to claim 8, wherein said calcium component is freshly slaked milk of lime.

10. A method according to claim 1, wherein said calcium component added in step a) and said additional calcium component added in step c) are the same.

11. A method according to claim 1, wherein aid calcium component added in step a) and said additional calcium component added n step c) are different.

12. The method of claim 1, wherein said phosphoric acid is either added simultaneously with said calcium component in Step a) or is added to said reaction vessel before addition of said calcium component in Step a).

* * * * *